Patented Dec. 14, 1948

2,456,589

UNITED STATES PATENT OFFICE 2,456,589

GRAY VAT DYESTUFFS AND METHOD OF MAKING THE SAME

Lawrence D. Lytle, Plainfield, N. J., assignor to American Cyanamid Company, New York, N. Y., a corporation of Maine No Drawing. Application March 23, 1944, Serial No. 527,857

4 Claims. (Cl. 260—274)

This invention relates to a new vatable composition capable of dyeing vegetable fibers greenish-gray shades. The composition contains vat dyestuffs of the benzanthrone-anthraquinone-acridine series.

There has been a considerable demand for vat dyestuffs capable of dyeing cellulosic fibers gray shades which are fast to light and which have a greenish tinge. None of the gray vat dyestuffs hitherto known have been satisfactory in giving the desired shade with good fastness.

Many years ago a vat dyestuff was obtained by condensing bzl - halogeno - benzanthrone with alpha amino anthraquinone and then closing the ring to produce the acridine dyestuff by alkali fusion. The dyestuff had the following formula:

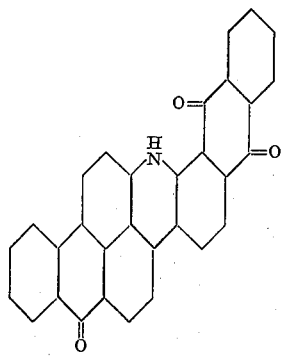

and dyed vegetable fibers olive-green shades. The greater the purity of the dyestuff the brighter the shades of olive-green produced by its use. It was, therefore, always attempted to produce a dyestuff of maximum purity. One of the main grounds of impurity adversely affecting the olive-green shade was the fact that it was difficult to produce pure bzl-chlorobenzanthrone, and every attempt was made to use as a starting material chlorobenzanthrone of maximum purity.

According to the present invention I have found that if there is used a crude bzl-chlorobenzanthrone obtained by chlorination in concentrated sulfuric acid at temperatures below 50° C. which is highly impure and which contains from 11.5–13.5% of chlorine, a dyestuff composition is obtained by condensing with alpha amino anthraquinone and ring closure by alkali fusion which dyes cellulosic fibers greenish-gray shades of great fastness to light and a fastness to peroxide superior to any vat grays commercially available coupled with a fastness to washing superior to most commercially available vat grays. I do not know the exact chemical composition of the new gray dyestuff and it is not intended to limit the present invention to any theory of exact chemical composition. I do know that the starting material, namely the impure bzl-chlorobenzanthrone is a mixture of mono- and dichlorinated benzanthrones, together with some unchanged benzanthrone and it seems reasonable to presume that the final dyestuff contains mixtures of various benzanthrone acridine dyestuffs possibly associated with other vatable constituents.

Not only is it most surprising that a gray dyestuff of outstanding properties is obtained when a deliberately impure starting material is produced, but it is also surprising that a dyestuff composition of reproduceable characteristics can be obtained although it must consist of a mixture of dyestuffs. However, such a product is obtainable and is readily reproduceable if the benzanthrone is chlorinated to the given degree.

While the present invention is not intended to be limited to exact methods of producing the mixed chlorinated benzanthrones best results are obtained by chlorination in concentrated sulfuric acid, at temperatures below 50° C. and preferably between 30 and 35° C. until the chlorine content of the resulting product precipitated by water is from 11.5 to 13.5%. This mixture of chlorinated benzanthrones is then condensed with alpha amino anthraquinone in the customary manner by heating in nitrobenzene in the presence of an acid binding substance and a cupriferous catalyst and the mixed secondary amines thus obtained after removal of the nitrobenzene are fused with an alcoholic caustic alkali. The fusion is then diluted with water and oxidized with air. It is an advantage of the present invention that the procedure of condensation and fusion is the same as that customarily employed in producing the olive-green benzanthrone-anthraquinone-acridine dyes. Thus the practice of the present invention does not involve new types of equipment or strange procedures.

While the vat composition of the present invention may be obtained in various physical forms, it is desirable for package dyeing to obtain an extremely finely dispersed product which may be produced by acid pasting with sulfuric acid of about 90%. This method is not claimed as part of the present invention but forms a part of the subject matter of the copending application of Lytle and Cullinan, Serial No. 526,340, filed March 13, 1944.

The invention will be described in greater detail in conjunction with the following specific examples, the parts being by weight.

Example

Benzanthrone is prepared by the customary method, that is to say by reducing a solution of anthraquinone in concentrated sulfuric acid by means of iron, reacting the reduction product with glycerin and precipitating the crude benzanthrone with water. The crude product is purified by boiling with caustic soda solution, filtered and dried. Insoluble material is then removed by dissolving the benzanthrone in hot dichlorobenzene, clarifying and filtering, the dichlorobenzene being removed from the clarified filtrate by steam stripping. Dry purified benzanthrone thus prepared is dissolved in sulfuric acid from 85–100% strength, preferably 93% sulfuric acid. Chlorine is then passed through the solution at a slow steady rate at a temperature between 30 and 35° C. During chlorination samples are taken at frequent intervals and analyzed by drowning in 10 parts of water, filtering off the precipitated product, washing with water and dilute soda ash solution, following by water washing until alkali free. The sample is then dried to a constant weight and its chlorine content determined by quantitative analysis. The chlorination is interrupted when the sample analyzes about 12.5% chlorine. Useful products are obtained, however, with chlorine contents from 11.5–13.5%. The material is then slowly run into cold water with stirring, and the chlorinated benzanthrone mixture is filtered off in a filter press, washed acid-free with cold water and 1% soda ash solution and finally washed alkali-free with water. It is then dried at 65° C.

80 parts of chlorinated benzanthrone mixture and 72 parts of alpha amino anthraquinone are reacted in 750 parts of nitrobenzene to which has been added 64 parts of soda ash, 4 parts of copper powder and 4 parts of iodine. The mixture is heated to boiling and carbon dioxide continuously passed over the surface of the liquid. Agitation is continuously maintained and at first a little water and nitrobenzene distills off. The heating is continued under a gentle reflux at about 210° C. for about 2 hours. Thereupon agitation is stopped and the batch cooled to room temperature. The condensation product is filtered off and filter cake completely freed of nitrobenzene by steam stripping. The residue is acidified with hydrochloric acid and boiled for a short time with stirring, followed by filtration and washing of the cake with water and drying.

The ring closure is effected in the customary cast iron fusion pot which is fitted with stirrer, thermometer, and a reflux condenser. It is charged with 187 parts of methyl alcohol and 375 parts of flaked caustic potash. The charge is then heated to its boiling point of 155° C. with stirring and maintained at this temperature for several hours. Thereupon it is cooled to 140° C. and at this temperature 50 parts of secondary amine mixture are added over a period of a few minutes with good agitation. The mixture is then heated to the boiling point which has now been reduced to 150° C. and maintained at this temperature with continued agitation until reaction is complete. The charge is then cooled to 110° C. and 325 parts of water slowly added with vigorous stirring and external cooling. The diluted product is then drowned in sufficient water to make a volume of 3000 parts. The temperature at this stage is maintained at 50° C. and air is blown through for several hours with continuous agitation until the leuco vat dyestuffs produced by the fusion are all oxidized. Thereupon the dyestuffs are filtered off and washed free of alkali with hot water.

The filter cake may be dispersed in a homogenizer with a suitable deflocculating agent such as sodium salt of disulfodinaphthylmethane to produce a uniform dye paste.

If a product suitable for package dyeing is desired the filter cake is acid pasted as follows:

257 parts of the cake containing 55 parts of solids and 202 parts of water are stirred with cooling and 2270 parts of 98% sulfuric acid are added very slowly. The temperature is held below 25° C. throughout the addition. A thick slurry results in which the acid strength is 90% and this slurry is stirred for many hours at 15–30° C. It is then diluted in 6000 parts of boiling water and stirred for a few moments. After further dilution with cold water the product is filtered and washed acid-free with water. The cake thus obtained is a very finely divided paste which disperses easily to form a free-flowing non-settling dye paste. The dispersion may be effected by adding 10 parts of sodium lignin sulfonate in 30 parts of glycerin to 308 parts of the filter cake. The paste is then screened through a 150 mesh screen and homogenized. This paste is suitable for package machine dyeing and gives a more level dyeing than commercial vat grays. It does not filter out on the outside of the package, reduces readily and completely, and is free from non-vatable material.

Greenish-gray dyeings are obtained on cotton which are very fast to light presenting practically no fading at 200 hours in the Fadometer and also show a very good wash fastness. The fastness to peroxide is superior to other commercial vat grays.

The purified benzanthrone produced as described above is not essential. Good products may be obtained by using as a starting material benzanthrone which has been purified by other known methods.

In the example caustic potash is described as the alkali in the ring closure step, but caustic soda may be used instead. The methyl alcohol may also be replaced by other alcohol, such as ethyl or butyl. In the condensation step soda ash and copper powder have been described as the acid-binding substances and cupriferous catalyst respectively, as these are commonly used for this purpose and give excellent results. However, the invention is not limited thereto and other acid-binding agents such as potassium carbonate or sodium acetate may be employed and the copper powder and iodine may be replaced by other cupriferous catalysts.

I claim:

1. A process of preparing a vattable composition capable of dyeing cellulosic fibers greenish-gray shades of excellent light-fastness, good wash-fastness, and extraordinary peroxide-fastness, which comprises chlorinating benzanthrone in sulfuric acid of 85–100% concentration at temperatures between 10° and 50° C. until a sample precipitated by water shows a chlorine content between 11.5 and 13.5%, discontinuing the chlorination and recovering the so chlorinated benzanthrone mixture containing 11.5 to 13.5% combined chlorine thus obtained, condensing the said chlorinated benzanthrone mixture with approximately one molecular equivalent of alpha-amino anthraquinone in nitrobenzene in the presence of an acid-binder and a cupriferous catalyst to produce a mixture of secondary amines and recovering the mixture of secondary amines so produced and subjecting said mixture of secondary amines thus produced to fusion with alcoholic caustic alkali and recovering the vat dyestuff so obtained.

2. The process of claim 1 wherein said chlorination is effected at temperatures between 30° and 50° C.

3. The method of claim 1 wherein the said chlorination is effected in sulfuric acid of approximately 93% strength.

4. The vattable composition produced by the process of claim 1, said vatable composition being capable of dyeing cellulosic fibers in greenish-gray shades of excellent light-fastness, good wash-fastness, and extraordinary peroxide-fastness.

LAWRENCE D. LYTLE.

REFERENCES CITED

The following references are of record in the file of this patent:

UNITED STATES PATENTS

| Number | Name | Date |
|---|---|---|
| 995,936 | Wolf | June 20, 1911 |
| 1,845,469 | Wolf | Feb. 16, 1932 |
| 1,851,019 | Murch | Mar. 29, 1932 |
| 1,955,135 | Kunz | Apr. 17, 1934 |
| 2,022,240 | Honold | Nov. 26, 1935 |
| 2,031,058 | Moser | Feb. 18, 1936 |
| 2,034,629 | Moser | Mar. 17, 1936 |
| 2,212,029 | Lulek | Aug. 20, 1940 |
| 2,251,566 | Graham | Aug. 5, 1941 |

FOREIGN PATENTS

| Number | Country | Date |
|---|---|---|
| 20,837 | Great Britain | 1906 |
| 178,942 | Switzerland | Nov. 1, 1935 |
| 306,874 | Great Britain | Feb. 22, 1929 |